US012314683B2

(12) United States Patent
Roy et al.

(10) Patent No.: US 12,314,683 B2
(45) Date of Patent: May 27, 2025

(54) METHODS AND SYSTEMS WITH BITWISE POOLING OPERATIONS

(71) Applicant: Samsung Electronics Co., Ltd., Suwon-si (KR)

(72) Inventors: Arnab Roy, Bengaluru (IN); Kiran Kolar Chandrasekharan, Bengaluru (IN); Sehwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 17/186,161

(22) Filed: Feb. 26, 2021

(65) Prior Publication Data
US 2021/0263738 A1   Aug. 26, 2021

(30) Foreign Application Priority Data

Feb. 26, 2020   (IN) .............................. 202041008134
Feb. 25, 2021   (KR) ........................ 10-2021-0025627

(51) Int. Cl.
*G06F 7/544*   (2006.01)
*G06F 9/30*    (2018.01)

(52) U.S. Cl.
CPC .......... *G06F 7/544* (2013.01); *G06F 9/30018* (2013.01); *G06F 9/30038* (2023.08)

(58) Field of Classification Search
CPC ...... G06F 7/544; G06F 7/38; G06F 7/02–026; G06F 2207/4824; G06F 17/15–153; G06F 9/30007–30029; G06N 3/00–126
See application file for complete search history.

(56) References Cited

U.S. PATENT DOCUMENTS

| | | |
|---|---|---|
| 2019/0042895 A1 | 2/2019 | Liang et al. |
| 2019/0087719 A1 | 3/2019 | Chedore et al. |
| 2019/0102671 A1 | 4/2019 | Cohen et al. |
| 2019/0370631 A1 | 12/2019 | Fais et al. |
| 2022/0083865 A1* | 3/2022 | Riazi ........................ G06N 3/04 |

FOREIGN PATENT DOCUMENTS

| | | |
|---|---|---|
| CN | 106886543 A | 6/2017 |
| CN | 110084215 A | 8/2019 |
| CN | 110084311 A | 8/2019 |
| KR | 10-2019-0114208 A | 10/2019 |

(Continued)

OTHER PUBLICATIONS

Abdellatef et al. "Stochastic Computing Correlation Utilization in Convolutional Neural Network Basic Functions", Dec. 2018, DOI: http://doi.org/10.12928/telkomnika.v16i6.8955 (Year: 2018).*

(Continued)

*Primary Examiner* — Andrew Caldwell
*Assistant Examiner* — Carlo Waje
(74) *Attorney, Agent, or Firm* — NSIP Law

(57) ABSTRACT

A method for performing a pooling operation in bitwise manner, the method includes performing a pooling operation on ternary data upon receiving an input ternary vector, receiving an input binary vector, providing a fused hardware for performing the pooling operation on any of the received binary and the ternary data, and executing the pooling operation performed bitwise through the fused hardware.

23 Claims, 13 Drawing Sheets

(56) References Cited

FOREIGN PATENT DOCUMENTS

| KR | 10-2019-0123372 A | 11/2019 |
|---|---|---|
| KR | 10-2019-0140527 A | 12/2019 |

OTHER PUBLICATIONS

Umuroglu et al. "FINN: A Framework for Fast, Scalable Binarized Neural Network Inference", 25th International Symposium on Field-Programmable Gate Arrays, Feb. 2017, https://arxiv.org/abs/1612.07119v1 (Year: 2016).*

S. Shukla et al., "A Scalable Multi-TeraOPS Core for AI Training and Inference," in IEEE Solid-State Circuits Letters, vol. 1, No. 12, pp. 217-220, Dec. 2018, doi: 10.1109/LSSC.2019.2902738. (Year: 2018).*

S. Yin et al., "An Energy-Efficient Reconfigurable Processor for Binary- and Ternary-Weight Neural Networks With Flexible Data Bit Width," in IEEE Journal of Solid-State Circuits, vol. 54, No. 4, pp. 1120-1136, Apr. 2019, doi: 10.1109/JSSC.2018.2881913. (Year: 2019).*

Hennessy et al., "Computer Organization and Design: The Hardware/Software Interface", Fifth Edition, 2014. Retrieved from <https://ict.iitk.ac.in/wp-content/uploads/CS422-Computer-Architecture-ComputerOrganizationAndDesign5thEdition2014.pdf> (Year: 2014).*

Nazari, Najmeh, et al. "TOT-Net: An Endeavor Toward Optimizing Ternary Neural Networks." *2019 22nd Euromicro Conference on Digital System Design (DSD)*. IEEE, 2019. (8 pages in English).

Ni, et al. "An Energy-Efficient Digital ReRAM-Crossbar-Based CNN With Bitwise Parallelism" *IEEE Journal on Exploratory Solid-State Computational Devices and Circuits* vol. 3 May 25, 2017, pp. 37-46 (10 pages in English).

Ghasemzadeh, et al. "ReBNet: Residual Binarized Neural Network" *IEEE 26$^{th}$ Annual International Symposium on Field-Programmable Custom Computing Machines* 2018 pp. 57-64 (8 pages in English).

Guo, et al. "Hardware Accelerator for Adversarial Attacks on Deep Learning Neural Networks" *Tenth International Green and Sustainable Computing Conference, Louisiana State University, Alibaba Group IEEE* 2019 pp. 1-8 (8 pages in English).

Extended European Search Report issued on Jul. 22, 2021, in counterpart European Patent Application No. 21159614.3 (9 pages in English).

Korean Office Action Issued on Mar. 27, 2025, in Counterpart Korean Patent Application No. 10-2021-0025627 (2 Pages in English, 5 Pages in Korean).

* cited by examiner

| Row# | w(m_prev) | x(v_prev) | y(m_n) | z(v_n) | m_out_max |
|---|---|---|---|---|---|
| 0 | 0 | 0 | 0 | 0 | 0 |
| 1 | 0 | 0 | 0 | 1 | X |
| 2 | 0 | 0 | 1 | 0 | 0 |
| 3 | 0 | 0 | 1 | 1 | 1 |
| 4 | 0 | 1 | 0 | 0 | X |
| 5 | 0 | 1 | 0 | 1 | X |
| 6 | 0 | 1 | 1 | 0 | X |
| 7 | 0 | 1 | 1 | 1 | X |
| 8 | 1 | 0 | 0 | 0 | 0 |
| 9 | 1 | 0 | 0 | 1 | X |
| 10 | 1 | 0 | 1 | 0 | 1 |
| 11 | 1 | 0 | 1 | 1 | 1 |
| 12 | 1 | 1 | 0 | 0 | 1 |
| 13 | 1 | 1 | 0 | 1 | X |
| 14 | 1 | 1 | 1 | 0 | 1 |
| 15 | 1 | 1 | 1 | 1 | 1 |

Fig. 6a

| wx \ yz | 00 | 01 | 11 | 10 |
|---|---|---|---|---|
| 00 | 0 | X | 1 | 0 |
| 01 | X | X | X | X |
| 11 | 1 | X | 1 | 1 |
| 10 | 0 | X | 1 | 1 |

Fig. 6b

| Row # | w(m_prev) | x(v_prev) | y(m_i_n) | z(v_i_n) | m_out_m_n |
|---|---|---|---|---|---|
| 0 | 0 | 0 | 0 | 0 | 0 |
| 1 | 0 | 0 | 0 | 1 | X |
| 2 | 0 | 0 | 1 | 0 | 1 |
| 3 | 0 | 0 | 1 | 1 | 0 |
| 4 | 0 | 1 | 0 | 0 | X |
| 5 | 0 | 1 | 0 | 1 | X |
| 6 | 0 | 1 | 1 | 0 | X |
| 7 | 0 | 1 | 1 | 1 | X |
| 8 | 1 | 0 | 0 | 0 | 1 |
| 9 | 1 | 0 | 0 | 1 | X |
| 10 | 1 | 0 | 1 | 0 | 1 |
| 11 | 1 | 0 | 1 | 1 | 1 |
| 12 | 1 | 1 | 0 | 0 | 0 |
| 13 | 1 | 1 | 0 | 1 | X |
| 14 | 1 | 1 | 1 | 0 | 1 |
| 15 | 1 | 1 | 1 | 1 | 1 |

Fig. 7a

| wx ↓ \ yz → | 00 | 01 | 11 | 10 |
|---|---|---|---|---|
| 00 | 0 | X | 0 | 1 |
| 01 | X | X | X | X |
| 11 | 0 | X | 1 | 1 |
| 10 | 1 | X | 1 | 1 |

Fig. 7b

Stride 1

Overlapping
ph/pw < stride

Stride 2

Non Overlapping
ph/pw >= stride

**Baseline design 2
(INT2 formatter)**

METHODS AND SYSTEMS WITH BITWISE POOLING OPERATIONS

CROSS-REFERENCE TO RELATED APPLICATIONS

This application claims the benefit under 35 USC 119 (a) of Korean Patent Application No. 10-2021-0025627 filed on Feb. 25, 2021, in the Korean Intellectual Property Office, which claims the benefit of Indian Patent Application number 202041008134 filed on Feb. 19, 2021, in the Indian intellectual property office, which claims the benefit of Indian Provisional Patent Application No. 202041008134 filed on Feb. 26, 2020, in the Indian intellectual property office, the entire disclosures of which are incorporated herein by reference for all purposes.

BACKGROUND

1. Field

The following description relates to methods and systems with bitwise pooling operations.

Neural networks (NNs) are ubiquitous models for solving a wide range of machine learning applications, like computer vision, speech recognition, text mining, etc. The accuracies of those models are achieved by compromising on significant storage area, power consumption, etc. To overcome these problems, a research domain called quantization is active over a couple of decades. Using quantization techniques, researchers try to find the lowest precision of data used NN models without significant effect on accuracy. Following the trend, Binary Neural Network (BNN) and Ternary Neural Network (TNN) have emerged with extremely low-level quantization, where data used in the models are binary (represented in 1 bit) and ternary (represented in 2 bits) respectively, instead of high precision data (>=8bits), for example.

One of the standard operations in NN models is pooling, where output data is selected from a group of input data based on a selection criteria. The selection criteria can be Max (known as Max pooling) or Min (known as Min pooling), where the selected output data is maximum and minimum data, respectively, from the group of input data. For high precision NN models, this pooling operation is done using high area, power-consuming comparator circuits. However, for the low precision NN model (BNN, TNN), we observe that instead of using comparator circuits, we can use an alternative way (which consumes lower area and dissipates lesser power compared to a comparator) to perform pooling operations.

In binary data, only two possible outputs are there; max and min pooling can be done by bitwise OR and AND operation, respectively. A ternary data is composed of mask and value; for pooling operation, a bitwise operation cannot be applied directly.

CNN models have been prevalent in the domain of computer vision. However, the high accuracy of CNN models comes at the cost of significant energy/power (in traditional CPU/GPU-based systems) and/or area (in case of custom-designed accelerator IPs) overheads.

To potentially alleviate this issue, BNN (Binary Neural Network) and TNN (Ternary Neural Network) are typical examples of extreme quantization used where model data (parameter, activation) can be represented in one and two bits, respectively.

Thus, there is a need for a solution that overcomes the above deficiencies.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method for performing a pooling operation in bitwise manner, the method includes performing a pooling operation on ternary data upon receiving an input ternary vector, receiving an input binary vector, providing a fused hardware for performing the pooling operation on any of the received binary and the ternary data, and executing the pooling operation performed bitwise through the fused hardware.

The pooling operation may be executed on the ternary data by receiving the input ternary vector in a signed representation, resolving the input ternary vector into an input mask bit vector and an input value bit vector, extracting a stored mask bit vector and a stored value bit vector with respect to a previously received ternary vector, generating a resultant mask bit vector by performing a first bitwise logical operation on the input mask bit vector, the input value bit vector, the stored mask bit vector, and the stored value bit vector, generating a resultant value bit vector by performing a second bitwise logical operation on the input value bit vector and the stored value bit vector, storing the resultant mask bit vector and the resultant value bit vector for a next set of bitwise logical operations, and generating a resultant ternary vector by concatenating the resultant mask bit vector and the resultant value bit vector.

The pooling operation may be executed on the binary data by receiving one or more input binary vectors in a signed-representation, extracting values of respective ones of the input binary vectors in a bit representation to generate a first binary bit vector, a second binary bit vector, a third binary bit vector, and a fourth binary bit vector, performing the first bitwise logical operation based on the first binary bit vector and the second binary bit vector as a resultant inner product vector for each of the first and second bit vectors, and performing the second bitwise logical operation based on the third binary bit vector and the fourth binary bit vector as another resultant inner product vector for each of the third and fourth bit vectors.

The executing, using the fused hardware, of the pooling operation may include receiving a 2M-bit vector as either the ternary data or the binary data, upon the 2M-bit vector being the ternary data, resolving the 2M-bit vector into an M-bit mask bit vector and a M-bit value bit vector, upon the 2M-bit vector being the binary data, resolving the 2M-bit vector into a first M-bit binary vector and a second M-bit binary vector, generating a resultant ternary vector by performing the pooling operation based on the M-bit mask bit vector and the M-bit value bit vector through a first data path of the fused hardware. The performing of the pooling operation may include executing the first bitwise logical operation and the second bitwise logical operation for the M-bit mask bit vector and the M-bit value bit vector based on a first branch of the first data path configured to execute pooling of the M-bit mask bit vector of the ternary data, and a second branch of the first data path configured to execute pooling of the M-bit value bit vector of the ternary data, and generating a resultant binary vector by performing a parallel pooling operation on the first M-bit binary vector and the second M-bit binary vector through a second data path of the fused hardware. The performing of the parallel pooling operation may include executing the first bitwise logical operation and the second bitwise logical operation for the first M-bit binary vector and the second M-bit binary vector based on a first branch of the second data path configured to execute pooling of the first M-bit binary vector, and a second branch of the second data path configured to execute pooling of the second M-bit binary vector in parallel with the first branch, resulting in pooling operations per cycle on the binary data being twice that of the ternary-data.

The first bitwise logical operation and the second bitwise logical operation may include performing a maximum pooling operation and a minimum pooling operation on the input ternary vector and previously stored ternary vector, obtaining resultant mask bits as maximum value and a minimum value corresponding to the maximum pooling operation and the minimum pooling operation, respectively, and obtaining resultant value bits corresponding to the maximum pooling operation and the minimum pooling operation, respectively.

The method may further include selecting between the resultant mask bits of the maximum pooling operation and the minimum pooling operation through a first multiplexer, and selecting between the resultant value bits of the maximum pooling operation and the minimum pooling operation through a second multiplexer.

The storing may include storing the resultant mask bit and the resultant value bits separately in a multibit register.

The first bitwise logical operation may include x OR z OR (w AND y), wherein w is a stored mask bit, x is a stored value bit, y is an input mask bit, and z is an input value bit.

The first bitwise logical operation may include (x AND y) OR (y AND (NOT z)) OR (w AND (NOT x)), wherein w is a stored mask bit, x is a stored value bit, y is an input mask bit, and z is an input value bit.

The second bitwise logical operation may include (x AND z) corresponding to the resultant value bit of a minimum pooling operation, wherein x is a stored value bit and z is an input value bit.

The second bitwise logical operation may include (x OR z) corresponding to the resultant value bit of a maximum pooling operation, wherein x is a stored value bit and z is an input value bit. The pooling operation may include generating a final output of a 2M-bit vector by concatenating an M-bits resultant mask vector and an M-bits resultant value vector, storing the 2M-bit vector concatenated, wherein bits (2M−1)-M represent stored mask vector and bits (M−1)-0 represent stored value vector, and configuring bits of the 2M-bit vector stored to initial values upon completion of the first and second bitwise logical operations.

The method may further include performing the first bitwise logical operation on the first M-bit binary vector and a first stored M-bit binary vector in the first branch of the data path as a result of the pooling operation for the first M-bit binary vector, performing the second bitwise logical operation on the second M-bit binary vector and a second stored M-bit binary vector in the second branch of the data path as a result of the pooling operation for the second M-bit binary vector, generating a first selected M-bit binary data by selecting amongst resultant M-bit binary vectors of a maximum pooling operation and a minimum pooling operation through a first multiplexer, generating a second selected M-bit binary data by selecting amongst resultant M-bit binary vectors of the maximum pooling operation and the minimum pooling operation through a second multiplexer, generating 2M-bit data by concatenating the first selected M-bit binary data and the second selected M-bit binary data, outputting the 2M-bit binary data concatenated, wherein bits (2M−1)-M represent output for the first M-bit binary vector and bits (M−1)-0 represent output for the second M-bit binary vector, storing the 2M-bit binary data concatenated, the storing configured to further perform first and second logical bitwise operations with respect to the binary data, wherein bits (2M−1)-M represent first stored binary vector and bits (M−1)-0 represent second stored binary vector, and configuring bits of the 2M-bit binary data stored to initial-values upon completion of the first and second logical bitwise operations with respect to the binary data.

The pooling operation may include either one or both of the maximum pooling operation being (x OR z) to generate the M-bit resultant binary data, and the minimum pooling operation being (x AND z) to generate the M-bit resultant binary data.

A non-transitory computer-readable storage medium may store instructions that, when executed by one or more processors, cause the one or more processors to perform the method above.

In another general aspect, a fused hardware for performing pooling operation, includes an electronic circuit configured to receive an input ternary vector and an input binary vector, and execute the pooling operation on either one or both of ternary data of the input ternary vector and binary data of the input binary vector.

For the pooling operation on the ternary data, the electronic circuit may be further configured to receive the input ternary vector in a signed representation, resolve the input ternary vector into an input mask bit vector and an input value bit vector, extract a stored mask bit vector and a stored value bit vector with respect to a previously received ternary vector, generate a resultant mask bit vector by performing a first bitwise logical operation based on the input mask bit vector, the input value bit vector, the stored mask bit vector, and the stored value bit vector, generate a resultant value bit vector by performing a second bitwise logical operation based on the input value bit vector and the stored value bit vector, store the resultant mask bit vector and the resultant value bit vector for a next set of bitwise logical operations, and generate a resultant ternary vector by concatenating the resultant mask bit vector and the resultant value bit vector to generate a resultant ternary vector.

For the pooling operation on the binary data, the electronic circuit may be further configured to receive one or more input binary vectors in a signed-representation, extract values of respective ones of the input binary vectors in a bit representation to generate a first binary bit vector, a second binary bit vector, a third binary bit vector, and a fourth binary bit vector, determine the first bitwise logical operation based on the first binary bit vector and the second binary bit vector as a resultant inner product vector for each of the first and second bit vectors, and determine the second bitwise logical operation based on the third binary bit vector and the fourth binary bit vector as another resultant inner product vector for each of the third and fourth bit vectors.

For executing the pooling operation bitwise through the fused-hardware, the electronic circuit may be further configured to receive a 2M-bit vector as either the ternary data or the binary data, upon the 2M-bit vector being the ternary data, resolve the 2M-bit vector into an M-bit mask bit vector and a M-bit value bit vector, upon the 2M-bit vector being the binary data, resolve the 2M-bit vector into a first M-bit binary vector and a second M-bit binary vector, generate a resultant ternary vector by performing the pooling operation based on the M-bit mask bit vector and the M-bit value bit vector through a first data path of the fused hardware. The performing of the pooling operation may include executing the first bitwise logical operation and the second bitwise logical operation for the M-bit mask bit vector and the M-bit value bit vector based on a first branch of the first data path configured to execute pooling of the M-bit mask bit vector of the ternary data, and a second branch of the first data path configured to execute pooling of the M-bit value bit vector of the ternary data.

The electronic circuit may be further configured to generate a resultant binary vector by performing a parallel pooling operation on the first M-bit binary vector and the second M-bit binary vector through a second data path of the fused hardware, wherein the performing of the parallel pooling operation comprises executing the first bitwise logical operation and the second bitwise logical operation for the first M-bit binary vector and the second M-bit binary vector based on a first branch of the second data path configured to execute pooling of the first M-bit binary vector, and a second branch of the second data path configured to execute pooling of the second M-bit binary vector in parallel with the first branch, resulting in pooling operations per cycle on the binary data being twice that of the ternary-data.

For the first and second logical operations, the electronic circuit may be further configured to perform a maximum pooling operation and a minimum pooling operation on the input ternary vector and previously stored ternary vector, obtain resultant mask bits as maximum value and a minimum value corresponding to the maximum pooling operation and the minimum pooling operation, respectively, and obtain resultant value bits corresponding to the maximum pooling operation and the minimum pooling operation, respectively.

In another general aspect, an apparatus includes one or more processors configured to receive an input ternary vector and an input binary vector, and execute a pooling operation on ternary data of the input ternary vector and binary data of the input binary vector.

The apparatus may further include a memory configured to store instructions, wherein the one or more processors are further configured to execute the instructions to configure the one or more processors to receive the input ternary vector and the input binary vector, and execute the pooling operation on the ternary data of the input ternary vector and the binary data of the input binary vector.

The one or more processors may be further configured to receive a 2M-bit vector as either the ternary data or the binary data, upon the 2M-bit vector being the ternary data, resolve the 2M-bit vector into an M-bit mask bit vector and a M-bit value bit vector, upon the 2M-bit vector being the binary data, resolve the 2M-bit vector into a first M-bit binary vector and a second M-bit binary vector, generate a resultant ternary vector by performing the pooling operation based on the M-bit mask bit vector and the M-bit value bit vector through a first data path of the fused hardware, wherein the performing of the pooling operation comprises executing the first bitwise logical operation and the second bitwise logical operation for the M-bit mask bit vector and the M-bit value bit vector based on a first branch of the first data path configured to execute pooling of the M-bit mask bit vector of the ternary data, and a second branch of the first data path configured to execute pooling of the M-bit value bit vector of the ternary data.

The one or more processors may be further configured to generate a resultant binary vector by performing a parallel pooling operation on the first M-bit binary vector and the second M-bit binary vector through a second data path of the fused hardware, wherein the performing of the parallel pooling operation comprises executing the first bitwise logical operation and the second bitwise logical operation for the first M-bit binary vector and the second M-bit binary vector based on a first branch of the second data path configured to execute pooling of the first M-bit binary vector, and a second branch of the second data path configured to execute pooling of the second M-bit binary vector in parallel with the first branch, resulting in pooling operations per cycle on the binary data being twice that of the ternary-data.

The apparatus may further include a multibit register comprising a mask pooling register configured to store the M-bit mask bit vector, and a value pooling register configured to store the M-bit value bit vector.

Other features and aspects will be apparent from the following detailed description, the drawings, and the claims.

BRIEF DESCRIPTION OF THE DRAWINGS

FIG. 6a illustrates an example of a truth table for determining a closed-form expression for generating a mask bit based on a maximum pooing operation performed on ternary data.

FIG. 6b illustrates an example of a Karnaugh-map (K-map) representation of the truth table described in the FIG. 6a.

FIG. 7a illustrates an example of a truth table for determining a closed-form expression for generating a mask bit based on a minimum pooing operation performed on ternary data.

FIG. 7b illustrates an example of a Karnaugh-map (K-map) representation of the truth table described in the FIG. 7a.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
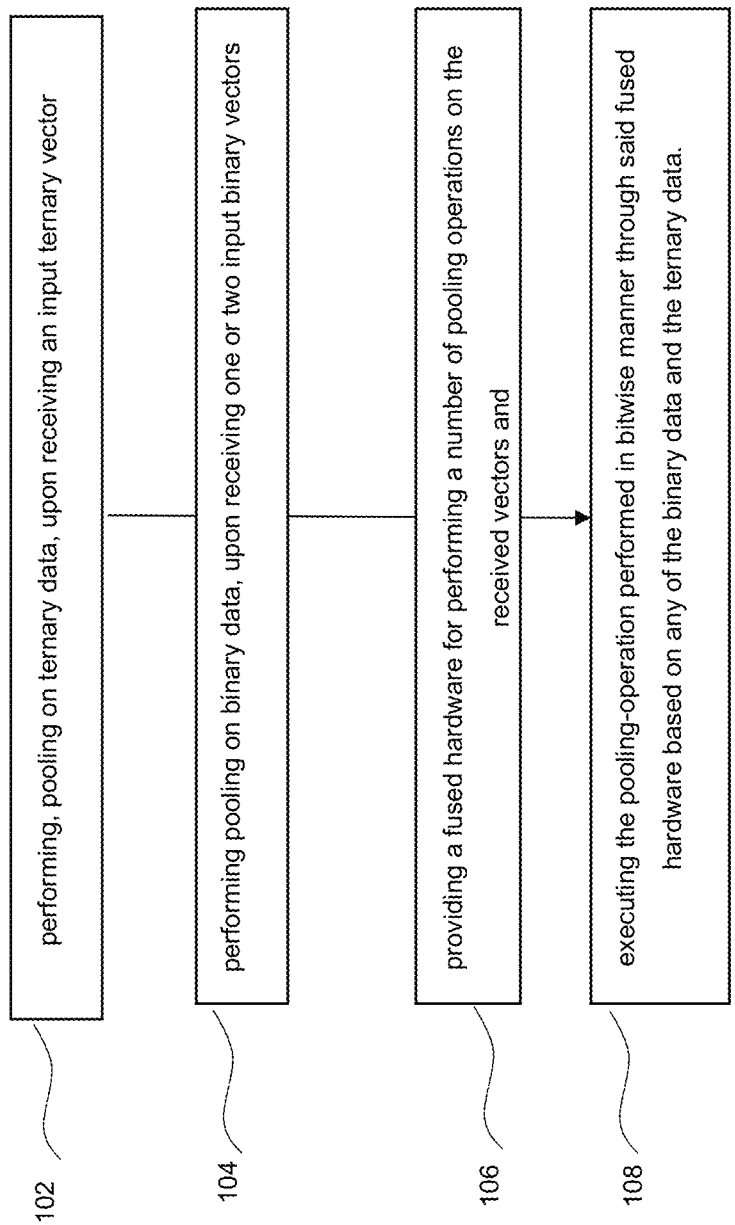
FIG. 1 illustrates an operational flow diagram depicting an example of a pooling operation method in a bitwise manner.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible, as will be apparent after an understanding of the disclosure of this application.

FIG. 1 illustrates an operational flow diagram 100 depicting an example of a method for performing pooling operation in a bitwise manner. In an example, the pooling operation may be performed in fused hardware on binary data and ternary data. In an example, the pooling operation may be performed upon combining individual data-paths needed for the pooling operation on the binary data and the ternary data into a single fused data-path in the fused hardware. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

For example, the method includes performing (operation 102) a pooling operation on ternary data received as an input ternary vector.

Continuing with the above example, the method includes receiving (operation 104) one or two input binary vectors.

Furthermore, in an example, the method includes providing (operation 106) fused hardware for performing a number of pooling operations on any of the received binary and the ternary data.

Additionally, the method includes executing (operation 108) the pooling-operation performed in a bitwise manner based on any of the binary data and the ternary data through said fused hardware.

Figure 2:
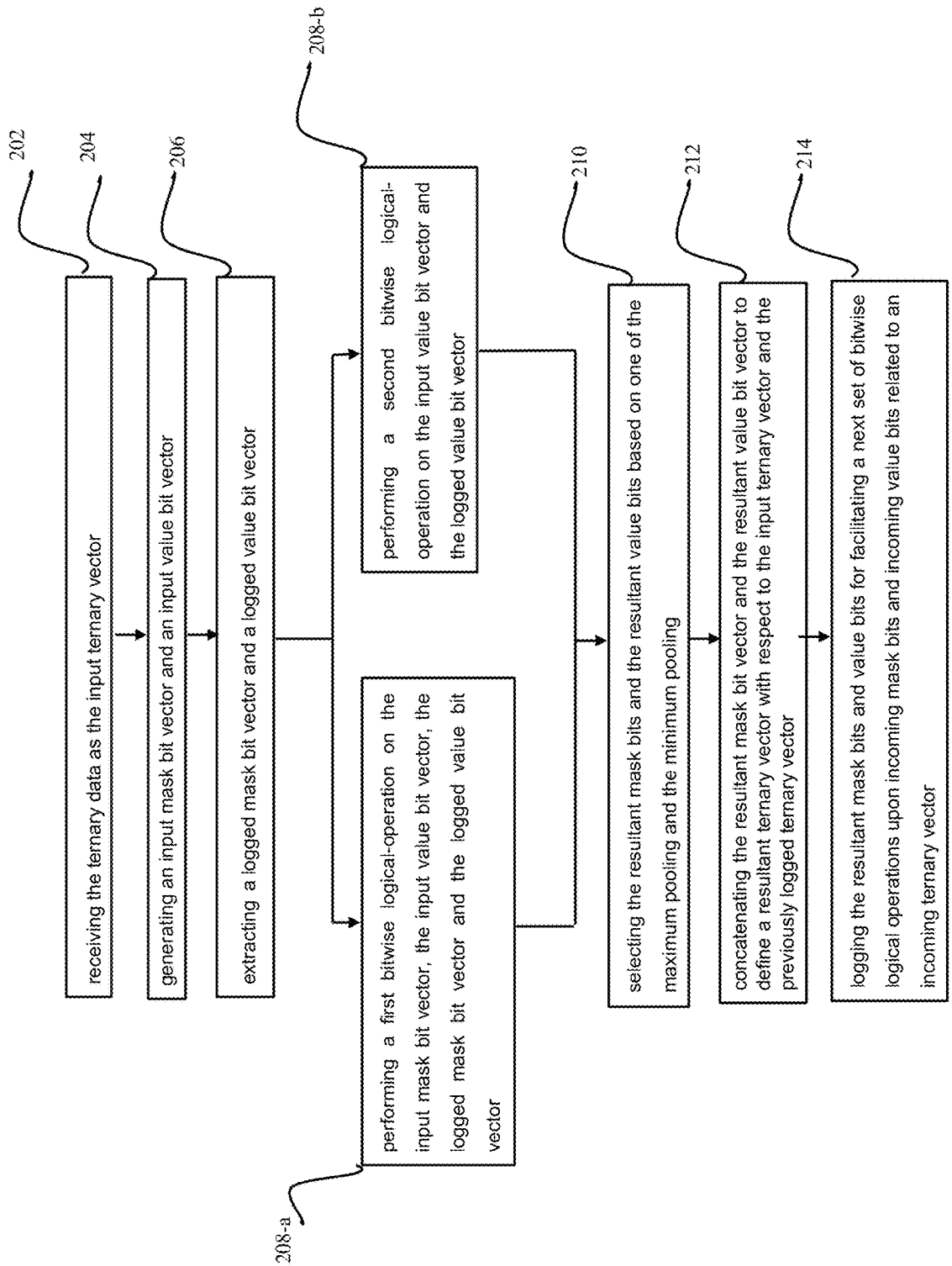
FIG. 2 illustrates an operational flow diagram depicting an example of a method for performing a pooling operation on ternary data.

FIG. 2 illustrates an operational flow diagram 200 depicting an example of a method for performing a pooling operation on ternary data. In an example, the ternary data may be related to an input ternary vector. In an example, the pooling operation may be performed on the ternary data in fused hardware that incorporates an electronic circuit. In an example, the fused hardware may include a first multiplexer, a second multiplexer, and a multibit register. In an example, the pooling operation may include maximum pooling and minimum pooling.

In an example, the method includes receiving (operation 202) the ternary data as the input ternary vector in a signed representation.

Upon receiving the ternary data, the method may generate (operation 204) an input mask bit vector and an input value bit vector. In an example, the input mask bit vector and the input value bit vector may be generated upon resolving the input ternary vector into the input mask bit vector and the input value bit vector.

Subsequently, the method may proceed towards extracting (operation 206) a stored mask bit vector and a stored value bit vector related to a previously received ternary vector.

Upon extracting the stored mask bit vector and the stored value bit vector, the method may proceed towards performing (operation 208-a) a first bitwise logical operation on the input mask bit vector, the input value bit vector, the stored mask bit vector, and the stored value bit vector. Upon performing the first bitwise logical operation, a resultant mask bit vector may be generated from the input mask bit vector, the input value bit vector, the stored mask bit vector, and the stored value bit vector.

Continuing with the above example, the method may perform (operation 208-b) a second bitwise logical operation on the input value bit vector and the stored value bit vector. In an example, the second bitwise logical operation may generate a resultant value bit vector. In an example, the first bitwise logical operation and the second bitwise logical operation may include performing the maximum pooling and the minimum pooling on the input ternary vector and the previously stored ternary vector. Furthermore, the first bitwise logical operation and the second bitwise logical operation may include obtaining a number of resultant mask bits as a maximum value and a minimum value related to the maximum pooling and the minimum pooling. The first bitwise logical operation and the second bitwise logical operation may also include obtaining a number of resultant value bits related to the maximum pooling and the minimum pooling.

The method may proceed towards selecting (operation 210) the resultant mask bits and the resultant value bits in the above example. In an example, the resultant mask bits may be selected based on a pooling mode, including one of the maximum pooling and the minimum pooling. In an example, the resultant mask bits may be selected from the mask bits, and the value bits generated after one of the maximum pooling and the minimum pooling is performed. In an example, the resultant mask bits may be selected by the first multiplexer of the fused hardware. In an example, the resultant value bits may be selected by the second multiplexer of the fused hardware.

In an example, the first bitwise logical operation defining the resultant mask bits for the maximum pooling operation may be defined by a formula, $x$ OR $z$ OR ($w$ AND $y$), wherein w is stored mask bit, x is stored value bit, y is input mask bit, and z is input value bit.

Furthermore, in an example, the first bitwise logical operation defining the resultant mask bits for the minimum pooling operation may be defined by a formula, ($x$ AND $y$) OR ($y$ AND ($NOT\ z$)) OR ($w$ AND ($NOT\ x$)), wherein w is stored mask bit, x is stored value bit, y is input mask bit, and z is input value bit.

In an example, the second bitwise logical operation may be defined as (x AND z) corresponding to the resultant value bit of a minimum pooling operation. In an example, the second bitwise logical operation may be defined as (x OR z) corresponding to the resultant value bit of a maximum pooling operation.

Furthermore, the method may proceed towards concatenating (operation 212) the resultant mask bit vector and the resultant value bit vector to define a resultant ternary vector with respect to the input ternary vector and the previously stored ternary vector. Upon competition of the pooling operation, the resultant ternary vector may be considered as a final output.

Further, the method may proceed towards storing or logging (operation 214) the resultant mask bits and value bits for facilitating the next set of bitwise logical operations upon incoming mask bits and incoming value bits related to an incoming ternary vector. In an example, the resultant mask bits and the resultant value bits may be stored separately in the multibit register. In an example, the resultant mask bits may be referred to as a resultant mask bit vector, and the resultant value bits may be referred to as a resultant value bit vector.

Figure 3:
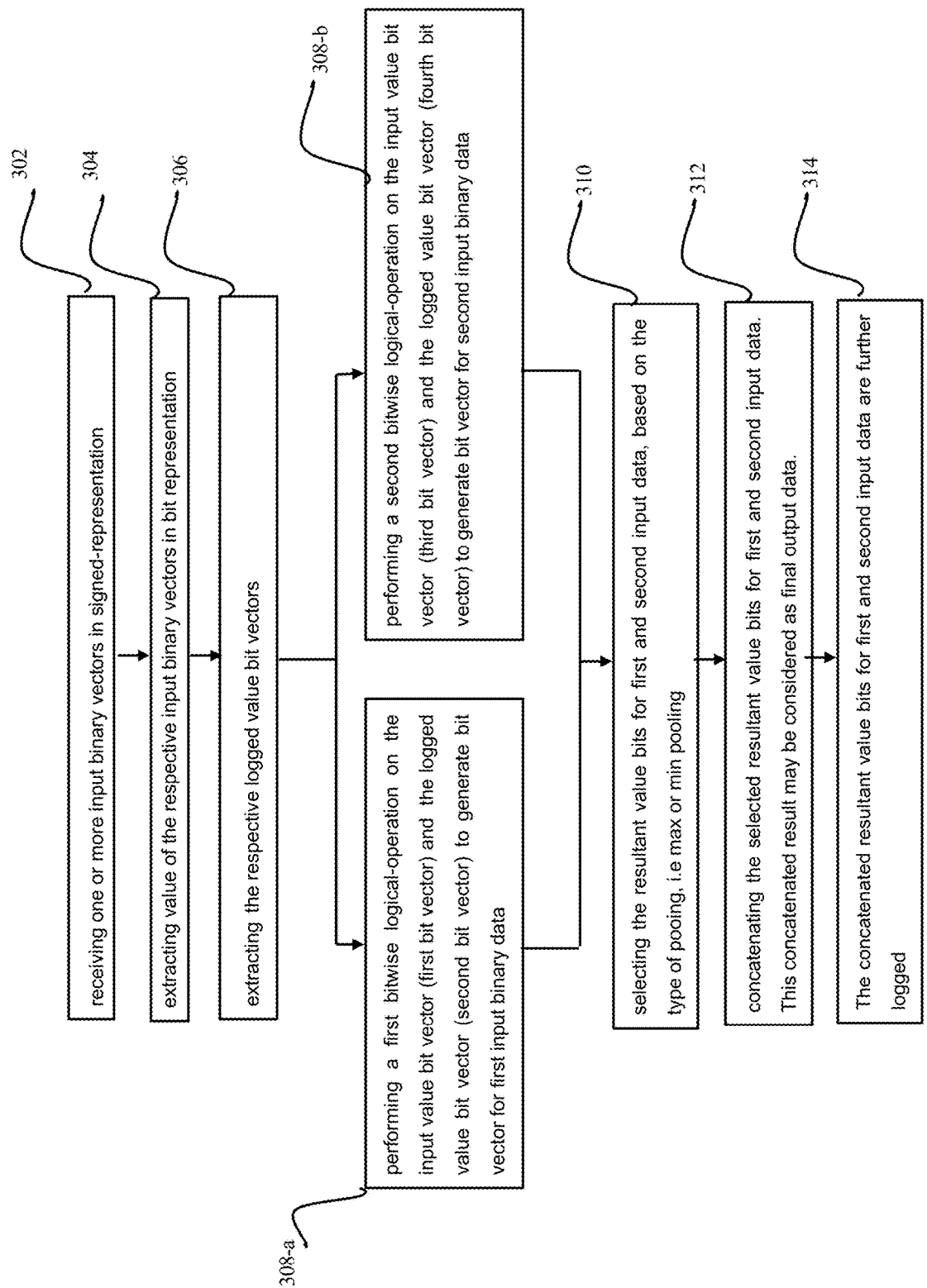
FIG. 3 illustrates an operational flow diagram depicting an example of a method for performing a pooling operation on binary data.

FIG. 3 illustrates an operational flow diagram 300 depicting an example of a method for performing a pooling operation on binary data. In an example, performing the pooling operation on the binary data may be based on a first bitwise logical operation and a second bitwise logical operation. In an example, the pooling operation may be performed bitwise through an electronic circuit incorporated in fused hardware. In an example, the fused hardware may include a first data path and a second data path. Further, each of the first data path and the second data path may include a first branch and a second branch. In an example, the pooling operation may include performing a first bitwise logical operation and a second bitwise logical operation on an input.

In an example, the method includes receiving (operation 302) one or more input binary vectors in signed-representation.

Upon receiving one or more input binary vectors, the method includes extracting (operation 304) value of the respective input binary vectors in bit representation to generate a first binary bit vector and a third binary bit vector.

Continuing with the above example, the method includes extracting (operation 306) a second binary bit vector and a fourth binary bit vector. In an example, the second binary bit vector and the fourth binary bit vector may be extracted from a stored register related to a first binary vector and a second binary vector amongst the one or more input binary vectors. In an example, the first binary vector may be referred to as "w," and the second binary vector may be referred to as "y."

The method includes performing (operation 308-a) the first bitwise logical operation between the first binary bit vector and the second binary bit vector. In an example, the first bitwise logical operation may include performing logic gate operations such as an OR operation (w OR y) and an AND operation (w AND y) for generating a number of resultant value bit vectors for the maximum pooling operation and the minimum pooling operation.

Subsequently, the method includes performing (operation 308-b) the second bitwise logical operation between a third binary vector and a fourth binary vector amongst the one or more binary vectors. In an example, the third binary vector may be referred to as "x," and the fourth binary vector may be referred to as "z." In an example, the second bitwise logical operation may include performing logic gate operations such as an OR operation (x OR z) and an AND operation (x AND z) for generating the number of resultant value bit vectors for the maximum pooling operation and the minimum pooling operation respectively.

Continuing with the above example, the method includes selecting (operation 310) the number of resultant bit vectors based on the pooling operation from each of the operation 308-a and the operation 308-b for first input data and second input data. In an example, selection may be based on one of the pooling operations, such as the maximum pooling operation and the minimum pooling operation.

Additionally, the method includes concatenating (operation 312) the number of resultant bit vectors for the first input data and the second input data. In an example, upon concatenation, the number of resultant vectors may be considered as final output data.

Upon concatenation, the method may proceed towards storing the final output data. In operation 314, the concatenated resultant value bits for first and second input data are further logged.

Figure 4:
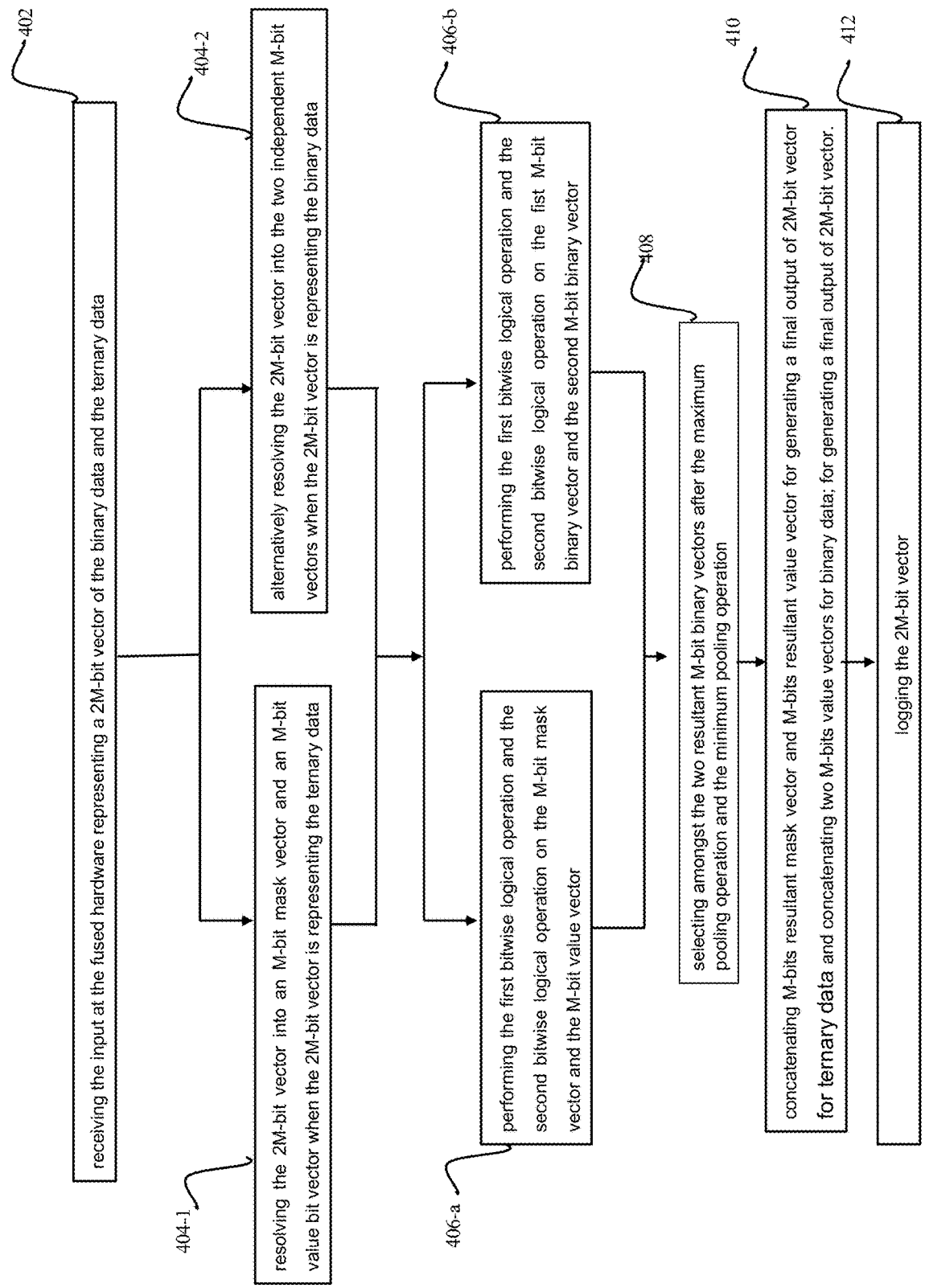
FIG. 4 illustrates an operational flow diagram depicting an example of executing a pooling operation on ternary data and binary data.

FIG. 4 illustrates an operational flow diagram 400 depicting an example of a method for executing a pooling operation on ternary data and binary data. In an example, the pooling operation may be performed bitwise in an electronic circuit incorporated in fused hardware. For example, the fused hardware may include a first data path and a second data path to support the pooling operation on binary data and ternary data. Further, each of the first data path and the second data path may include a first branch and a second branch. In an example, the pooling operation may include performing a first bitwise logical operation and a second bitwise logical operation on an input. In an example, the first bitwise logical operation may be performed on the first branch, and subsequently, the second bitwise logical operation may be performed on the second branch.

In an example, the method may include receiving (operation 402) the input at the fused hardware. In an example, the input may be a 2M-bit vector representative of the binary data and the ternary data. In an example, the ternary data may be related to an input ternary vector, and the binary data may be related to an input binary vector. For example, where the 2M-bit vector represents the ternary data, the 2M-bit vector may be received as one M bit mask vector and one M bit value vector. Continuing with the above example, alternatively, where the 2M-bit vector represents the binary vector, the 2M-bit vector may be received as two independent value bit vectors referred to as a first M-bit binary value vector and a second M-bit binary value vector.

Upon receiving the 2M-bit vector as the input, the method may resolve (operation 404-1) the 2M-bit vector into an M-bit mask vector and an M-bit value bit vector when the 2M-bit vector is representing the ternary data. Continuing with the above example, the method may further include alternatively resolving (operation 404-2) the 2M-bit vector into the two independent M-bit vectors when the 2M-bit vector represents the binary data.

Subsequently, the method may perform (operation 406-a) the first bitwise logical operation and the second bitwise logical operation on the M-bit mask vector and the M-bit value vector. In an example, the first bitwise logical operation and the second bitwise logical operation may be performed in the first data path of the fused hardware. In an example, the first bitwise logical operation and the second bitwise logical operation may be based on the first branch of the first data path configured to execute pooling of the M-bit mask bit vector of the ternary data and the second branch of the first data path configured to execute pooling of the M-bit value bit vector of the ternary data.

Additionally, the method may proceed towards selecting amongst the two resultant M-bit mask vectors after the maximum pooling operation and the minimum pooling operation through a first multiplexer to result in a first selected M-bit mask vector. Furthermore, the method may select amongst the two resultant M-bit value vectors after the maximum pooling operation and the minimum pooling operation through a second multiplexer to result in a second selected M-bit value vector.

In parallel to operation 406-a, the method may proceed towards performing (operation 406-b) the first bitwise logical operation and the second bitwise logical operation on the first M-bit binary value vector and the second M-bit binary value vector. In an example, the first bitwise logical operation and the second bitwise logical operation may be performed in the second data path of the fused hardware. In an example, the first bitwise logical operation and the second bitwise logical operation may be based on the first branch of the second data path configured to execute pooling of the first M-bit binary value vector and the second branch of the second data path configured to execute pooling of the second M-bit binary value vector in parallel with the first branch to thereby cause pooling operations per cycle on binary data twice that of the ternary-data.

Additionally, the method may proceed towards selecting (408) amongst the two resultant M-bit binary value vectors. In an example, the method includes selecting an M-bit mask vector through a first multiplexer upon performing the maximum pooling operation and the minimum pooling operation on the two resultant M-bit mask vectors related to the ternary data. Further, the method includes selecting an M-bit value vector through a second multiplexer upon performing the maximum pooling operation and the minimum pooling operation on the two resultant M-bit value vectors.

Additionally, the method includes selecting an M-bit vector through the first multiplexer upon performing the maximum pooling operation and the minimum pooling operation on the two resultant M-bit binary vectors related to the binary data. Further, the method includes selecting an M-bit value vector through the second multiplexer upon performing the maximum pooling operation and the minimum pooling operation on the two resultant M-bit value vectors.

Additionally, the method may proceed towards concatenating (operation 410) M-bits resultant mask vector and M-bits resultant value vector for generating a final output of 2M-bit vector upon performing one of the pooling operations on the ternary data. Additionally, the method includes concatenating two M-bits value vector for generating a final output of 2M-bit vector upon performing one of the pooling operations on the binary data.

In an example, the method may proceed towards storing (operation 412) the 2M-bit vector concatenated in operation 410. In an example, the 2M-bit vector may include (2M−1)-M bits representing a stored mask vector related to the ternary data. Further, the concatenated 2M-bit vector may also include (M−1)-0 bits representing a stored value vector related to the ternary data. For example, the 2M bit vector may include (2M−1)-M bits representing the first stored value vector and (M−1)-0 bits representing the second stored value vector related to the binary data. Further, the method may include configuring the stored bits to initial values upon completing the pooling operation. In an example, the pooling operation may include one of the maximum pooling and the minimum pooling based on the binary data and the ternary data.

Figure 5:
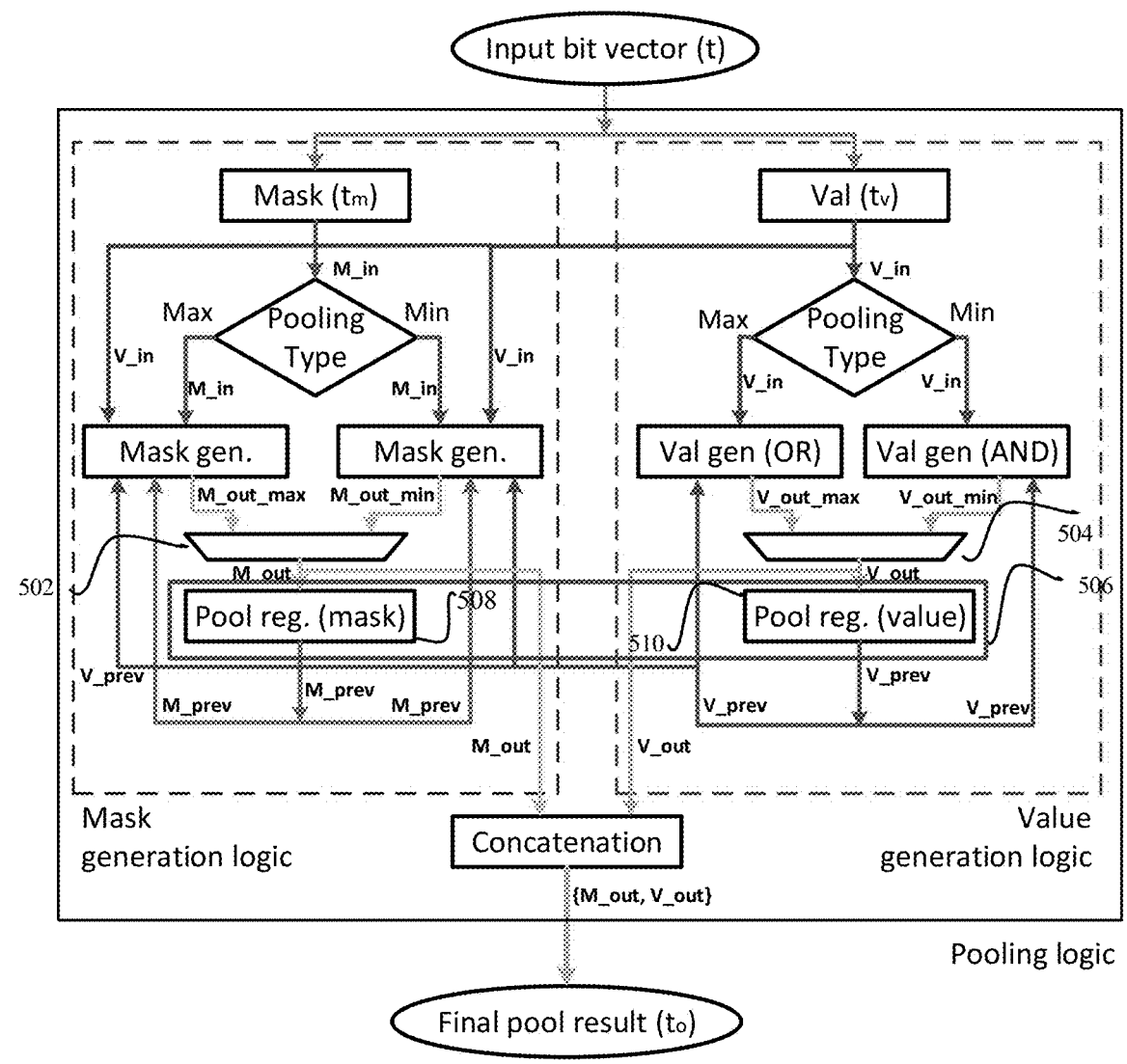
FIG. 5 illustrates an example of an electronic circuit for performing a pooling operation on ternary data.

FIG. 5 illustrates an electronic circuit 500 for performing an example of a pooling operation on ternary data. In an example, the ternary data may be related to an input ternary vector received by the electronic circuit 500. In an example, the pooling operation may be performed on the ternary data in fused hardware incorporating the electronic circuit 500. In an example, the pooling operation may be performed on the ternary data. In an example, the fused hardware may include a first multiplexer 502, a second multiplexer 504, and a multibit register 506. In an example, the multibit register 506 may include a mask pooling register 508 for storing one or more mask vectors and a value pooling register 510 for storing one or more value vectors. In an example, the pooling may include maximum pooling and minimum pooling.

In an example, the electronic circuit 500 may be configured to generate a mask and a value separately. Continuing with the above example, the electronic circuit 500 may further be configured to concatenate the mask and the value upon generation for pooling the ternary data. In an example, the pooling may include maximum pooling and minimum pooling. In an example, the mask may be generated based on current bits and previous bits. In an example, the current bits may be the bits related to an input ternary vector. Further, the previous bits may be referred to as previously stored bits related to a previous ternary vector stored in the mask pooling register 508 and the value pooling register 510.

In an example, the pooling operation may be performed temporally in consecutive cycles in the case of multiple input ternary vectors. In an example, the multiple input ternary vectors may include four tensor inputs (t1, t2, t3, and t4) to perform the pooling operation. A sequence of operations may be such as, at $1^{st}$ cycle: $t^{out\_1} = \text{pool}(t^1, t^2)$ at $2^{nd}$ cycle $t^{out\_2} = \text{pool}(t^{out\_1}, t^3)$ at $3^{rd}$ cycle $t^{out\_3} = \text{pool}(t^{out\_2}, t^4)$ Further, the final output of the pooling operation may be tout_3. An intermediate result may be stored as tout_1, tout_2, tout_3 for cycles 1, 2, and 3, respectively. "Pool" may refer to the pooling operation. In an example, an initial value of the intermediate result (i.e., tout_0) may be set with a predetermined value based on the pooling mode. In an example, the pooling mode may be one of the maximum pooling and the minimum pooling. The updated sequence may be as follows, at $1^{st}$ cycle: $t^{out\_1} = \text{pool}(t^{out\_0}, t^1)$ at $2^{nd}$ cycle $t^{out\_2} = \text{pool}(t^{out\_1}, t^2)$ at $3^{rd}$ cycle $t^{out\_3} = \text{pool}(t^{out\_2}, t^3)$ at $4^{th}$ cycle $t^{out\_4} = \text{pool}(t^{out\_3}, t^4)$ where $t^{out\_0}$ is the initial value of the intermediate result. The initial value of the intermediate result may be set such that $t^{out\_1} = t^1$ for any of the pooling modes.

FIG. 6a illustrates an example of a truth table 600a for determining a closed-form expression for generating a mask bit based on a maximum pooing operation performed on ternary data. In an example, the truth table 600a may be based on an equation x OR z OR (w AND y) such that w is stored mask bit, x is stored value bit, y is input mask bit, and z is input value bit In an example, table 600a includes a number of combinations of a number of input bits. In an example, the number of input bits includes an input mask, an input value, a stored mask, and a stored value and a corresponding output mask bit present in a number of rows. Further, one or more rows amongst the rows with invalid ternary data in any of the input and the stored ternary data (mask-value bit pair) may be considered invalid rows. In an example, the invalid ternary data may include the mask bit as 0 and the value bit as 1. Further, the corresponding output bit to the invalid rows may be indicated as "X." The reasoning of the output bits for the rows other than the invalid rows amongst the number of rows is explained below. The notation of the explanation should be followed as, a) {w,x}: stored ternary data (mask-value bit pair)
b) {y,z}: current (input) ternary data (mask-value bit pair)
c) {w,x}→dv: stored ternary data in decimal format defined as v.
d) {y,z}→dv: current ternary data in decimal format defined as v.

In an example, the number of valid rows may be such as:
a) Row 0: {w,x}={0,0}→d0; {y,z}={0,0}→d0; In the Row 0, decimal values are 0, hence max pool is d0, and mask bit is 0, thereby m_out=0.
b) Row 2: {w,x}={0,0}→d0; {y,z}={1,0}→d−1; In the Row 2, one decimal value is 0 and another decimal value is −1, hence, max pool is d0, thereby m_out=0.
c) Row 3: {w,x}={0,0}→d0; {y,z}={1,1}→d1; In the Row 3, one decimal value is 0 and another decimal value is 1, hence max pool is d1, mask bit is 1, thereby m_out=1.
d) Row 8: {w,x}={1,0}→d−1; {y,z}={0,0}→d0; In the Row 8, one decimal value is −1 and another decimal value is 0, max pool is d0, m_out=0.
e) Row 10: {w,x}={1,0}→d−1; {y,z}={1,0}→d−1; In the Row 10, decimal values are −1, max pool is d−1. m_out=1.
f) Row 11: {w,x}={1,0}→d−1; {y,z}={1,1}→d1; In the Row 11, one decimal value is −1 and another is 1, max pool is 1, i.e., d1, m_out=1.
g) Row 12: {w,x}={1,1}→d1; {y,z}={0,0}→d0; In the Row 12, one decimal value is 1 and another is 0, max pool is 1, i.e., d1, m_out=1.
h) Row 14: {w,x}={1,1}→d1; {y,z}={1,0}→d−1; In the Row 14, one decimal value is 1 and another is −1, max pool is 1, i.e., d1, m_out=1.
i) Row 15: {w,x}={1,1}→d1; {y,z}={1,1}→d1; In the Row 15, decimal values are 1, max pool is 1, i.e., d1, m_out=1.

FIG. 6b illustrates an example of a Karnaugh-map (K-map) representation 600b of the truth table 600a described in the FIG. 6a. In an example, the equation x OR z OR (w AND y) may be derived from the K-map representation 600b.

FIG. 7a illustrates an example of a truth table 700a for determining a closed-form expression for generating a mask bit based on a minimum pooing operation performed on ternary data. In an example, the truth table 700a may be based on an equation (x AND y) OR (y AND (NOT z)) OR (w AND (NOT x)) such that w is stored mask bit, x is stored value bit, y is input mask bit, and z is input value bit.

In an example, table 700a includes a number of combinations of a number of input bits. In an example, the number of input bits includes an input mask, an input value, a stored mask, and a stored value and a corresponding output mask bit present in a number of rows. Further, one or more rows amongst the rows with invalid ternary data in any of the input and the stored ternary data (mask-value bit pair) may be considered invalid rows. In an example, the invalid ternary data may include the mask bit as 0 and the value bit as 1. Further, the corresponding output bit to the invalid rows may be indicated as "X." The reasoning of the output bits for the rows other than the invalid rows amongst the number of rows is explained below. The notation of the explanation should be followed as, a) {w,x}: stored ternary data (mask-value bit pair)
b) {y,z}: current (input) ternary data (mask-value bit pair)
c) {w,x}→dv: stored ternary data in decimal format defined as v.
d) {y,z}→dv: current ternary data in decimal format defined as v.

In an example, the number of valid rows may be such as:
a) Row 0: {w,x}={0,0}→d0; {y,z}={0,0}→d0; In the Row 0 decimal values are 0, min pool is d0, mask bit is 0, m_out=0.
b) Row 2: {w,x}={0,0}→d0; {y,z}={1,0}→d-1; In the Row 2 one decimal value is 0 and another value is -1, min pool is d-1, bit mask is 1, m_out=1.
c) Row 3: {w,x}={0,0}→d0; {y,z}={1,1}→d1; In the Row 3 one decimal value is 0 and another value is 1, min pool is d0, mask bit is 0, m_out=0.
d) Row 8: {w,x}={1,0}→d-1; {y,z}={0,0}→d0; In the Row 8 one decimal value is -1 and another value is 0, min pool is d-1, m_out=1.
e) Row 10: {w,x}={1,0}→d-1; {y,z}={1,0}→d-1; In the Row 10 decimal values are -1, min pool is d-1, m_out=1.
f) Row 11: {w,x}={1,0}→d-1; {y,z}={1,1}→d1; In the Row 11 one decimal value is -1 and another is 1, min pool is -1, i.e., d-1, m_out=1.
g) Row 12: {w,x}={1,1}→d1; {y,z}={0,0}→d0; In the Row 12 one decimal value is 1 and another is 0, min pool is 0, i.e., d1, m_out=0.
h) Row 14: {w,x}={1,1}→d1; {y,z}={1,0}→d-1; In the Row 14 one decimal value is 1 and another is -1, min pool is -1, i.e., d1, m_out=1.
i) Row 15: {w,x}={1,1}→d1; {y,z}={1,1}→d-1; In the Row 15 decimal values are 1, min pool is 1, i.e., d1, m_out=1.

FIG. 7b illustrates an example of a Karnaugh-map (K-map) representation 700b of the truth table 700a described in the FIG. 7a. In an example, the equation (x AND y) OR (y AND (NOT z)) OR (w AND (NOT x)) may be derived from the K-map representation 700b.

Figure 8:
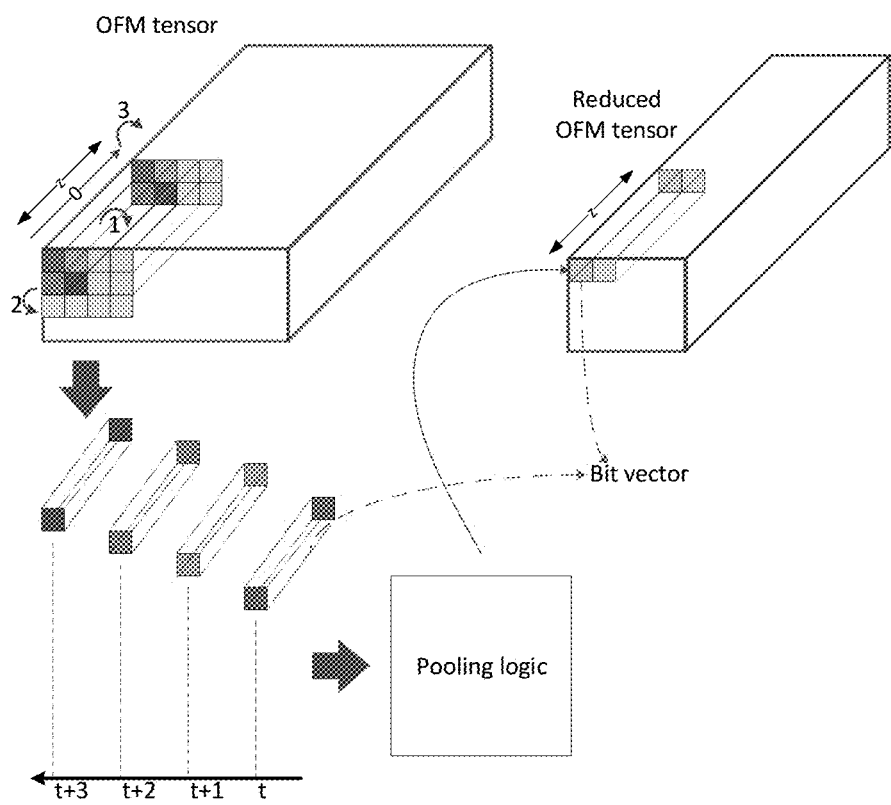
FIG. 8 illustrates an example of a diagram depicting the generation of a reduced Output Feature Map (OFM) tensor after a pooling operation.

FIG. 8 illustrates diagram 800 depicting the generation of an example of a reduced OFM tensor after a pooling operation. In an example, for performing a bitwise operation such as the pooling operation, an input bit vector may be formed in a channel first order. For example, the pooling operation may be performed in a temporal way to support one or more arbitrary pooling parameters such as a window, a stride, or the like. In an example, a pooling window size may be ph×pw, and a channel vector length may be z. Furthermore, At operation 0, the ph×pw number of IFM vectors (each of length z) may be consumed sequentially to generate one OFM channel-vector of length z.

At operations 1 & 2, the OFM channel vector of length z may be generated in row-major order.

At operation 3, a shift to the next z depth may take place. Operations 0-3 may be repeated till a complete OFM tensor is formed.

A loop traversal to generate the reduced OFM tensor is
If operand_type==binary
   channel_operation=vector_len*2
else
   channel_operation=vector_len
for (ofm_ch=0; ofm_ch<OFM_CHANNEL; ofm_ch=ofm_ch+channel_operation) {//channel upd.
  for (ofm_h=0; ofm_h<OFM_REDUCED_HEIGHT; ofm_h=ofm_h+pooling_stride) {//height upd.
    for (ofm_w=0; ofm_w<OFM_REDUCED_WIDTH; ofm_w=ofm_w+pooling_stride) {//width upd.
      for (ph=0; ph<POOL_HEIGHT; ph=ph+1) {//pool window height upd.
        for (pw=0; pw<POOL_WIDTH; pw=pw+1) {//pool window width upd.
          ofm_reduced [ofm_h, ofm_w] [ofm_ch: (ofm_ch+vector_len)]
          =pool_op (ofm [(ofm_h+ph), (ofm_w+pw)]) [ofm_ch: (ofm_ch+vector_len)] }}}}}}

In an example, POOL_HEIGHT and POOL_WIDTH may be set as 2. Using the two innermost loop levels (red and green), from an OFM tensor with a 2×2×z pooling window, a single 1×1×z reduced OFM tensor may be generated.

Based on any of the binary mode or the ternary mode, a channel operation may be decided. In an example, the channel operation may be updated based on the input data size as the input data size is vector_len for the ternary data and 2*vector_len for the binary data. For every cycle, the bit vector length of vector_len/(vector_len*2) from the IFM tensor may be fetched and processed by a Pooling Unit (PU). The operation may be continued for the pooling window size (i.e., POOL_HEIGHT×POOL_WIDTH), to generate an OFM pixel vector (of length z, i.e., vector_len/(vector_len*2)) of a particular XY co-ordinate in OFM tensor. The process may continue till the entire OFM tensor generation is completed.

Figure 9:
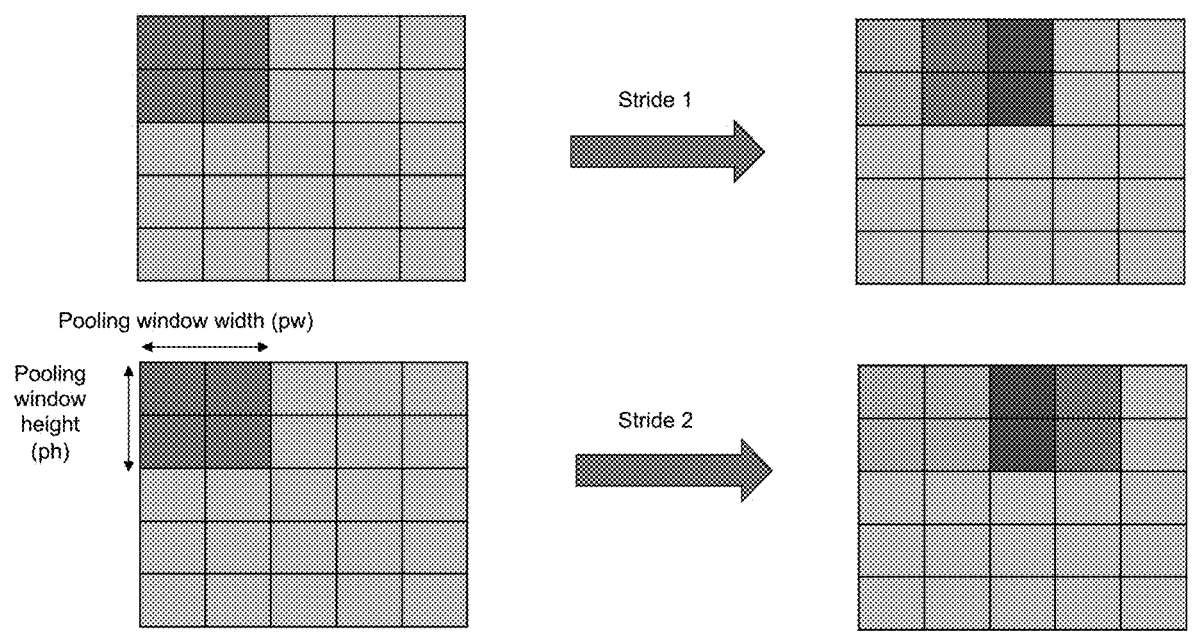
FIG. 9 illustrates an example of a diagram depicting a stride performed during a pooling operation.

FIG. 9 illustrates a diagram 900 depicting an example of a stride performed during a pooling operation. In an example, a number of darker gray boxes may indicate a pooling window. In an example, the pooling window size may be 2×2. In an example, the stride may be referred to as an amount of shift each box (pixel) in the pooling window maintains for the next cycle.

Figure 10:
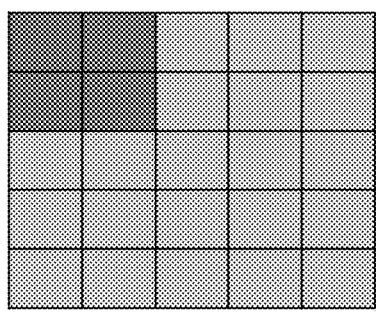
FIG. 10 illustrates an example of a diagram depicting an overlapping pooling window during a pooling operation.
Figure 10:
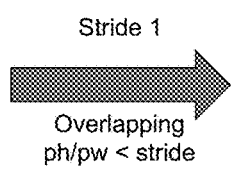
Figure 10:
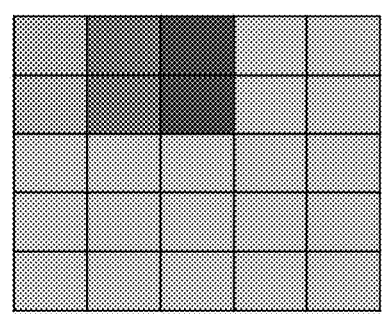
Figure 10:
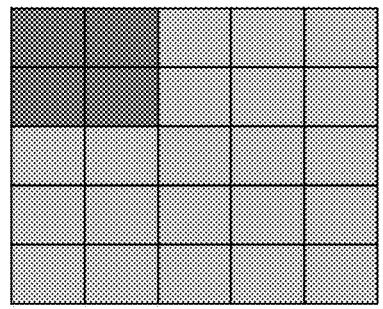
Figure 10:
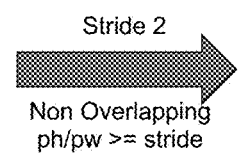
Figure 10:
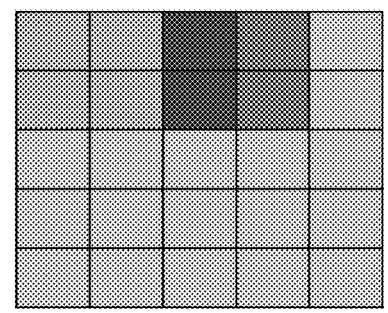

FIG. 10 illustrates a diagram 1000 depicting an example of overlapping during a pooling operation. In an example, a number of darker gray boxes may indicate a pooling window. In an example, the pooling window size may be 2×2. In an example, where it is determined that the pooling window height/width may be less than the stride, the overlapping is formed. In an example, the pooling operation may be referred to as "overlapping pooling" as the pooling window may overlap upon hovering in OFM X-Y plane to generate the output (reduced) OFM plane. In an example, where it is determined that the pooling window height/width may greater or equal to stride—the pooling operation may be referred to as "non-overlapping pooling." as the pooling window may not overlap upon hovering in the OFM X-Y plane to generate the output (reduced) OFM plane.

Figure 11:
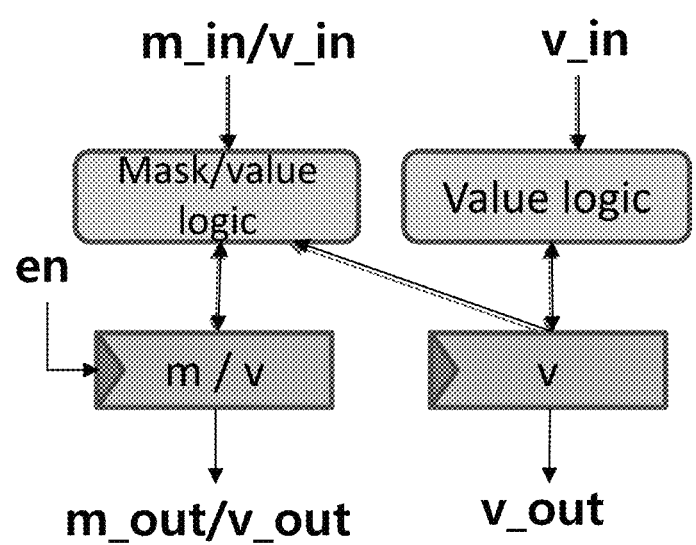
FIG. 11 illustrates an example of a bitwise design for a pooling operation.

FIG. 11 illustrates an example of a bitwise design 1100 for a pooling operation. In an m register, a value may be stored for binary data. In an example, "m_in" may indicate input mask and value bit vectors, respectively. Further, a mask logic and a value logic may represent a pooling operation logic associated with the pooling operation for generating the mask and the value bit vectors, respectively. In an example, a stored mask bit vector may be represented as "m," and a stored value bit register may be represented as "v" in a register, respectively. In an example, a mask and value logic and the register may be utilized for performing bitwise pooling operations on the binary data and ternary data.

Figure 12:
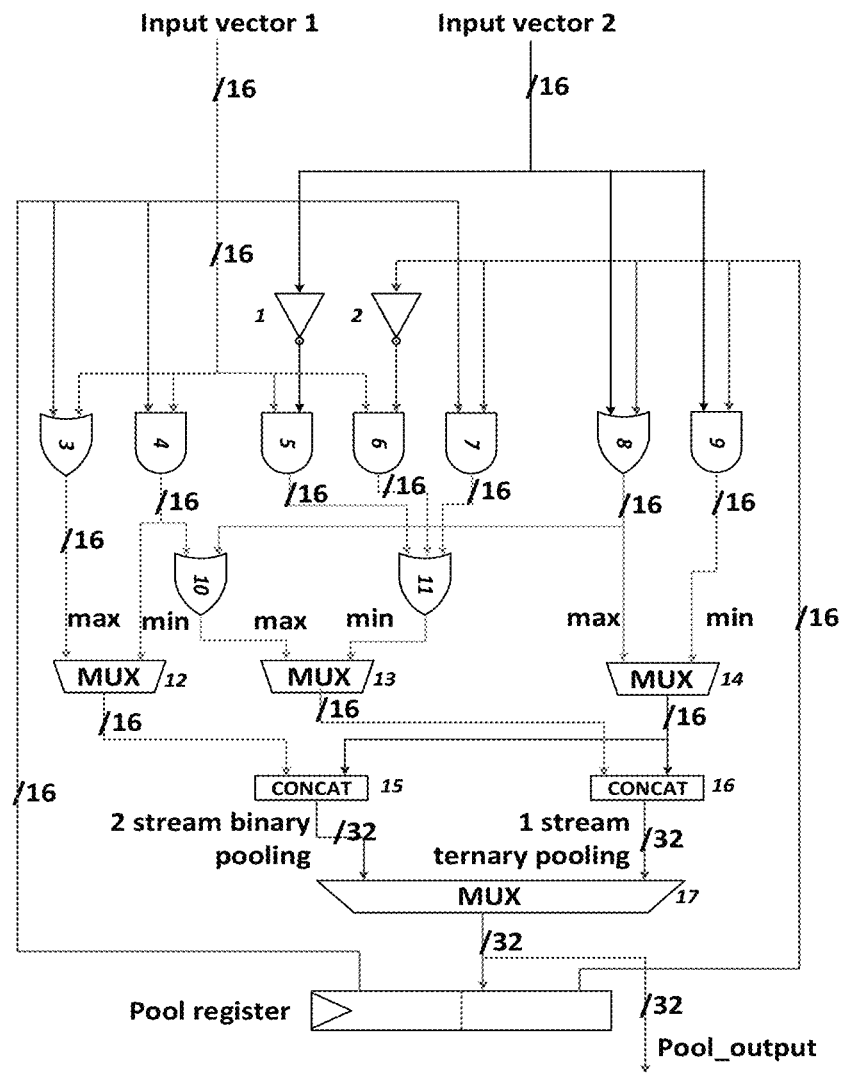
FIG. 12 illustrates an example of a micro-architecture diagram depicting fused hardware.

FIG. 12 illustrates an example of a micro-architecture diagram 1200 depicting fused hardware. In an example, the fused data path may be for a pooling operation on binary data and ternary data. In an example, a line w may indicate w, a line x may indicate x, a line y may indicate y, and a line z may indicate z such that w is stored mask bit, x is stored value bit, y is input mask bit, and z is input value bit.

In an example, the micro-architecture diagram 1200 may include a number of logic gates for performing the pooling operation on the binary data and the ternary data. In an example, a micro-architecture including one 16 ternary data vector and two independent 16 binary data vectors is described below:

a) First data path (for pooling operation on the ternary data):
1. y (m_in): 16-bit mask vector
2. z (v_in): 16-bit value vector b) Output:
1. pool_output: 32-bit vector as pooling output wherein bits 31-16 represent mask and bits 15-0 represent value.

c) Internal operations:
m_out_max=x OR z OR (w AND y) (output of gate 10)
m_out_min=(x AND y) OR (y AND (NOT z)) OR (w AND (NOT x)) (output of gate 11)
v_out_max=x OR z (output of gate 8)
v_out_min=x AND z (output of gate 9)

An output of 13 may select a mask vector, and an output of 14 may select a value vector based on the pooling operation type. A Concat (16) logic may concatenate the output from 13 and 14. An output of 17 may select the output of 16 for pooling mode as "ternary." The output of 17 may include two fan-outs (branches). One branch may go to a pool register to store (log) the concatenated value, and another branch may come out as an output.

Second Data Path (for Pooling Operation on the Binary Data), a) Input:
1. y (m_in): 16-bit vector for binary stream 2
2. z (v_in): 16-bit vector for binary stream 1.

b) Output:
1. pool_output: 32-bit vector as pooling output in which bits 31-16 represent output for stream 2 and bits 15-0 represent output for stream 1.

c) Internal operations:
v_out_max_1=x OR z (output of gate 8)
v_out_min_1=x AND z (output of gate 9)
v_out_max_2=w OR y (output of gate 3)
v_out_min_2=w AND y (output of gate 4)

An output of gate 1 may be an inverted z. An output of gate 2 may be an inverted x. An output of gate 5 may be based on w AND the output of gate 1. An output of gate 6 may be based on y AND the output of gate 2. An output of gate 7 may select an output based on x AND w. An output of 12 may select a pool result vector of one binary stream, and an output of 14 may select a pool result vector of another binary stream based on the pooling operation type. A Concat (15) logic may concatenate the output from 12 and 14. An output of 17 may select the output of 15 for the pooling mode set to "binary." The output of 17 may include two fan-outs (branches). One branch may go to the pool register to store (log) the concatenated value, and another branch may come out as an output. In an example, the hardware design may perform pooling operations for 2 binary streams in parallel (as compared to 1 ternary stream). Hence, the number for pooling operations per cycle (throughput) on the binary data may be doubled compared to the ternary data.

Figure 13A:
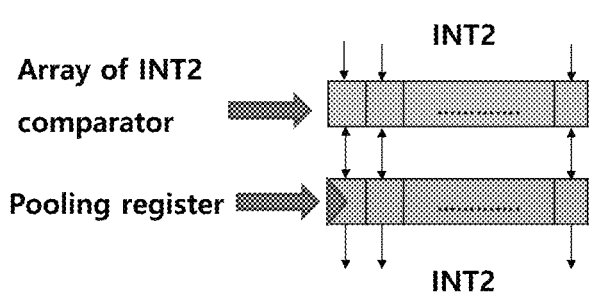
FIG. 13a illustrates an example of a diagram depicting a baseline design with a 2-bit integer (INT2)

FIG. 13*a* illustrates a diagram 1300*a* depicting an example of a baseline design with a 2-bit integer (INT2). In the baseline design, an input may be an array of the INT2 element. After an element-wise comparison, an output may be stored in a pooling register. In an example, the INT2 datatype may implicitly support binary data such as {−1,+1} and ternary data such as {−1,0+1}). For the pooling operation, baseline hardware with an array of the INT2 data as input, an array of comparators, and an array of INT2 pooling registers may be selected.

Figure 13B:
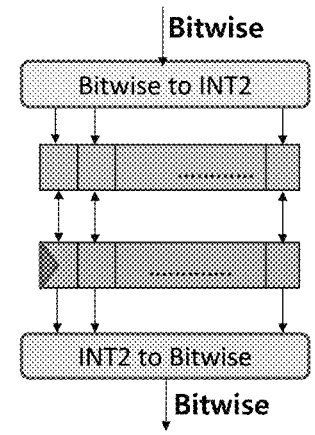
FIG. 13b illustrates an example of a diagram depicting a baseline design with one or more formatter logics (INT2_formatter).

FIG. 13*b* illustrates an example of a diagram 1300*b* depicting a baseline design with one or more formatter logics (INT2_formatter). In an example, one or more formatter logics may be used to support a bitwise data path.

The electronic circuit 500, first multiplexer 502, second multiplexer 504, multibit register 506, mask pooling register 508, value pooling register 510, and fused hardware in FIGS. 1-13*b* that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13*b* that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method for performing pooling operations, the method comprising:
   performing, using logic gates of a first data path of logic circuitry of fused hardware, either one or both of a first maximum pooling operation and a first minimum pooling operation in a bitwise manner on respective 2-bit ternary data of a ternary vector;
   performing, using logic gates of a second data path of the logic circuitry including one or more of the logic gates of the first data path, either one or both of a second maximum pooling operation and a second minimum pooling operation of respective 1-bit binary data of a binary vector; and
   performing, using the first data path and the second data path of the logic circuitry, a third pooling operation in the bitwise manner on an input ternary vector or an input binary vector.

2. The method of claim 1, wherein the either one or both of the first maximum pooling operation and the first minimum pooling operation on the ternary data by the fused hardware includes:
   receiving the ternary data as the input ternary vector in a signed representation;
   resolving the input ternary vector into an input mask bit vector and an input value bit vector;
   extracting a stored mask bit vector and a stored value bit vector with respect to a previously received ternary vector;
   generating a resultant mask bit vector by performing a first bitwise logical operation on the input mask bit vector, the input value bit vector, the stored mask bit vector, and the stored value bit vector;
   generating a resultant value bit vector by performing a second bitwise logical operation on the input value bit vector and the stored value bit vector;
   storing the resultant mask bit vector and the resultant value bit vector for a next set of bitwise logical operations; and
   generating a resultant ternary vector by concatenating the resultant mask bit vector and the resultant value bit vector.

3. The method of claim 1, wherein the either one or both of the second maximum pooling operation and the second minimum pooling operation on the binary data includes:
   receiving one or more input binary vectors in a signed-representation;
   extracting values of respective ones of the input binary vectors in a bit representation to generate a first binary bit vector, a second binary bit vector, a third binary bit vector, and a fourth binary bit vector;
   performing a first bitwise logical operation based on the first binary bit vector and the second binary bit vector as a resultant inner product vector for each of the first and second bit vectors; and performing a second bitwise logical operation based on the third binary bit vector and the fourth binary bit vector as another resultant inner product vector for each of the third and fourth bit vectors.

4. The method of claim 1, wherein the third pooling operation performed bitwise comprises:
receiving a 2M-bit vector as either the ternary data or the binary data;
upon the 2M-bit vector being the ternary data, resolving the 2M-bit vector into an M-bit mask bit vector and a M-bit value bit vector;
upon the 2M-bit vector being the binary data, resolving the 2M-bit vector into a first M-bit binary vector and a second M-bit binary vector;
generating a resultant ternary vector by performing the third pooling operation based on the M-bit mask bit vector and the M-bit value bit vector through the first data path of the logic circuitry, wherein the performing of the third pooling operation comprises executing a first bitwise logical operation and a second bitwise logical operation for the M-bit mask bit vector and the M-bit value bit vector based on:
a first branch of the first data path configured to execute pooling of the M-bit mask bit vector of the ternary data; and
a second branch of the first data path configured to execute pooling of the M-bit value bit vector of the ternary data; and
generating a resultant binary vector by performing a parallel pooling operation on the first M-bit binary vector and the second M-bit binary vector through the second data path of the logic circuitry, wherein the performing of the parallel pooling operation comprises executing the first bitwise logical operation and the second bitwise logical operation for the first M-bit binary vector and the second M-bit binary vector based on:
a first branch of the second data path configured to execute pooling of the first M-bit binary vector; and
a second branch of the second data path configured to execute pooling of the second M-bit binary vector in parallel with the first branch, resulting in pooling operations per cycle on the binary data being twice that of the ternary-data.

5. The method of claim 2, wherein the first bitwise logical operation and the second bitwise logical operation comprise:
performing a maximum pooling operation and a minimum pooling operation on the input ternary vector and previously stored ternary vector;
obtaining resultant mask bits as maximum value and a minimum value corresponding to the maximum pooling operation and the minimum pooling operation, respectively; and
obtaining resultant value bits corresponding to the maximum pooling operation and the minimum pooling operation, respectively.

6. The method of claim 5, further comprising:
selecting between the resultant mask bits of the maximum pooling operation and the minimum pooling operation through a first multiplexer; and
selecting between the resultant value bits of the maximum pooling operation and the minimum pooling operation through a second multiplexer.

7. The method of claim 2, wherein the storing comprises storing the resultant mask bit vector and the resultant value bit vector separately in a multibit register.

8. The method of claim 2, wherein, for the first bitwise logical operation, the logic circuitry is configured to:
perform x OR z OR (w AND y),
wherein w is a stored mask bit, x is a stored value bit, y is an input mask bit, and
z is an input value bit.

9. The method of claim 2, wherein, for the first bitwise logical operation, the logic circuitry is configured to:
perform (x AND y) OR (y AND (NOT z)) OR (w AND (NOT x)),
wherein w is a stored mask bit, x is a stored value bit, y is an input mask bit, and z is an input value bit.

10. The method of claim 2, wherein, for the second bitwise logical operation, the logic circuitry is configured to:
perform x AND z corresponding to a resultant value bit of a minimum pooling operation, wherein x is a stored value bit and z is an input value bit.

11. The method of claim 2,
wherein, for the second bitwise logical operation, the logic circuitry is configured to perform x OR z corresponding to a resultant value bit of a maximum pooling operation, wherein x is a stored value bit and z is an input value bit, and
wherein the either one or both of the first maximum pooling operation and the first minimum pooling operation comprises:
generating a final output of a 2M-bit vector by concatenating an M-bits resultant mask vector and an M-bits resultant value vector;
storing the 2M-bit vector concatenated, wherein bits (2M−1)-M represent stored mask vector and bits (M−1)-0 represent stored value vector; and
configuring bits of the 2M-bit vector stored to initial values upon completion of the first and second bitwise logical operations.

12. The method of claim 4, further comprising:
performing the first bitwise logical operation on the first M-bit binary vector and a first stored M-bit binary vector in the first branch of the second data path as a result of the pooling operation for the first M-bit binary vector;
performing the second bitwise logical operation on the second M-bit binary vector and a second stored M-bit binary vector in the second branch of the second data path as a result of the pooling operation for the second M-bit binary vector;
generating a first selected M-bit binary data by selecting amongst resultant M-bit binary vectors of a maximum pooling operation and a minimum pooling operation through a first multiplexer for the fused hardware;
generating a second selected M-bit binary data by selecting amongst the resultant M-bit binary vectors of the maximum pooling operation and the minimum pooling operation through a second multiplexer for the fused hardware;
generating 2M-bit binary data by concatenating the first selected M-bit binary data and the second selected M-bit binary data;
outputting the 2M-bit binary data concatenated, wherein bits (2M−1)-M represent output for the first M-bit binary vector and bits (M−1)-0 represent output for the second M-bit binary vector;
storing the 2M-bit binary data concatenated, the storing configured to further perform first and second logical bitwise operations with respect to the binary data, wherein bits (2M−1)-M represent first stored binary vector and bits (M−1)-0 represent second stored binary vector; and configuring bits of the 2M-bit binary data stored to initial-values upon completion of the first and second logical bitwise operations with respect to the binary data.

13. The method of claim 12, wherein the logic circuitry is configured to either one or both of:

perform the maximum pooling operation by x OR z to generate a M-bit resultant binary data; and perform the minimum pooling operation by x AND z to generate the M-bit resultant binary data, wherein x is a stored value bit and z is an input value bit.

14. A non-transitory computer-readable storage medium storing instructions that, when executed by one or more processors, cause the one or more processors to perform the method of claim 1.

15. A fused hardware for performing pooling operation in a bitwise manner, comprising:

an electronic circuit comprising a fused hardware, wherein the electronic circuit is configured to:

perform, using logic gates of a first data path of logic circuitry of the fused hardware, either one or both of a first maximum pooling operation and a first minimum pooling operation in a bitwise manner on respective 2-bit ternary data of a ternary vector;

perform, using logic gates of a second data path of the logic circuitry including one or more of the logic gates of the first data path, either one or both of a second maximum pooling operation and a second minimum pooling operation of respective 1-bit binary data of a binary vector; and perform, using the first data path and the second data path of the logic circuitry, a third pooling operation in the bitwise manner on an input ternary vector or an input binary vector.

16. The fused hardware of claim 15, wherein for the either one or both of the first maximum pooling operation and the first minimum pooling operation on the ternary data, the electronic circuit is further configured to:

receive the input ternary vector in a signed representation;

resolve the input ternary vector into an input mask bit vector and an input value bit vector;

extract a stored mask bit vector and a stored value bit vector with respect to a previously received ternary vector;

generate a resultant mask bit vector by performing a first bitwise logical operation based on the input mask bit vector, the input value bit vector, the stored mask bit vector, and the stored value bit vector;

generate a resultant value bit vector by performing a second bitwise logical operation based on the input value bit vector and the stored value bit vector;

store the resultant mask bit vector and the resultant value bit vector for a next set of bitwise logical operations; and generate a resultant ternary vector by concatenating the resultant mask bit vector and the resultant value bit vector to generate the resultant ternary vector.

17. The fused hardware of claim 15, wherein for the either one or both of the second maximum pooling operation and the second minimum pooling operation on the binary data, the electronic circuit is further configured to:

receive one or more input binary vectors in a signed-representation;

extract values of respective ones of the input binary vectors in a bit representation to generate a first binary bit vector, a second binary bit vector, a third binary bit vector, and a fourth binary bit vector;

determine a first bitwise logical operation based on the first binary bit vector and the second binary bit vector as a resultant inner product vector for each of the first and second bit vectors; and determine a second bitwise logical operation based on the third binary bit vector and the fourth binary bit vector as another resultant inner product vector for each of the third and fourth bit vectors.

18. The fused hardware of claim 15, wherein for the third pooling operation, the electronic circuit is further configured to:

receive a 2M-bit vector as either the ternary data or the binary data;

upon the 2M-bit vector being the ternary data, resolve the 2M-bit vector into an M-bit mask bit vector and a M-bit value bit vector;

upon the 2M-bit vector being the binary data, resolve the 2M-bit vector into a first M-bit binary vector and a second M-bit binary vector;

generate a resultant ternary vector by performing the third pooling operation based on the M-bit mask bit vector and the M-bit value bit vector through the first data path of the fused hardware, wherein the performing of the third pooling operation comprises executing a first bitwise logical operation and a second bitwise logical operation for the M-bit mask bit vector and the M-bit value bit vector based on:

a first branch of the first data path configured to execute pooling of the M-bit mask bit vector of the ternary data; and a second branch of the first data path configured to execute pooling of the M-bit value bit vector of the ternary data; and generate a resultant binary vector by performing a parallel pooling operation on the first M-bit binary vector and the second M-bit binary vector through the second data path of the fused hardware, wherein the performing of the parallel pooling operation comprises executing the first bitwise logical operation and the second bitwise logical operation for the first M-bit binary vector and the second M-bit binary vector based on:

a first branch of the second data path configured to execute pooling of the first M-bit binary vector; and a second branch of the second data path configured to execute pooling of the second M-bit binary vector in parallel with the first branch, resulting in pooling operations per cycle on the binary data being twice that of the ternary-data.

19. The fused hardware of claim 16, wherein for the first and second bitwise logical operations, the electronic circuit is further configured to:

perform a maximum pooling operation and a minimum pooling operation on the input ternary vector and previously stored ternary vector;

obtain resultant mask bits as maximum value and a minimum value corresponding to the maximum pooling operation and the minimum pooling operation, respectively; and obtain resultant value bits corresponding to the maximum pooling operation and the minimum pooling operation, respectively.

20. An apparatus, comprising:
one or more processors comprising a fused hardware, wherein the one or more processors are configured to:
perform, using logic gates of a first data path of logic circuitry of the fused hardware, either one or both of a first maximum pooling operation and a first minimum pooling operation in a bitwise manner on ternary data of an input ternary vector; and
perform, using logic gates of a second data path of the logic circuitry including one or more of the logic gates of the first data path, either one or both of a second maximum pooling operation and a second minimum pooling operation on binary data of an input binary vector.

21. The apparatus of claim 20, further comprising a memory configured to store instructions;
wherein the one or more processors are further configured to execute the instructions to perform the either one or both of the first maximum pooling operation and the first minimum pooling operation in the bitwise manner on the ternary data of the input ternary vector, and perform the either one or both of the second maximum pooling operation and the second minimum pooling operation on the binary data of the input binary vector.

22. The apparatus of claim 21, wherein the one or more processors are further configured to:
receive a 2M-bit vector as either the ternary data or the binary data;
upon the 2M-bit vector being the ternary data, resolve the 2M-bit vector into an M-bit mask bit vector and a M-bit value bit vector;
upon the 2M-bit vector being the binary data, resolve the 2M-bit vector into a first M-bit binary vector and a second M-bit binary vector;
generate a resultant ternary vector by performing a third pooling operation based on the M-bit mask bit vector and the M-bit value bit vector through the first data path of the fused hardware, wherein the performing of the third pooling operation comprises executing a first bitwise logical operation and a second bitwise logical operation for the M-bit mask bit vector and the M-bit value bit vector based on:
a first branch of the first data path configured to execute pooling of the M-bit mask bit vector of the ternary data; and
a second branch of the first data path configured to execute pooling of the M-bit value bit vector of the ternary data; and
generate a resultant binary vector by performing a parallel pooling operation on the first M-bit binary vector and the second M-bit binary vector through the second data path of the fused hardware, wherein the performing of the parallel pooling operation comprises executing the first bitwise logical operation and the second bitwise logical operation for the first M-bit binary vector and the second M-bit binary vector based on:
a first branch of the second data path configured to execute pooling of the first M-bit binary vector; and
a second branch of the second data path configured to execute pooling of the second M-bit binary vector in parallel with the first branch, resulting in pooling operations per cycle on the binary data being twice that of the ternary-data.

23. The apparatus of claim 22, further comprising:
a multibit register comprising a mask pooling register configured to store the M-bit mask bit vector, and a value pooling register configured to store the M-bit value bit vector.

\* \* \* \* \*